United States Patent
Maze et al.

(10) Patent No.: US 9,065,754 B2
(45) Date of Patent: Jun. 23, 2015

(54) CLIENT BASED CONGESTION CONTROL MECHANISM

(75) Inventors: Frédéric Maze, Langan (FR); Philippe Boucachard, Rennes (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 837 days.

(21) Appl. No.: 13/294,035

(22) Filed: Nov. 10, 2011

(65) Prior Publication Data

US 2012/0120805 A1 May 17, 2012

(30) Foreign Application Priority Data

Nov. 16, 2010 (GB) .................................. 1019344.9

(51) Int. Cl.
| | |
|---|---|
| H04L 12/28 | (2006.01) |
| H04L 12/801 | (2013.01) |
| H04L 1/18 | (2006.01) |
| H04L 12/825 | (2013.01) |
| H04L 12/835 | (2013.01) |
| H04J 1/16 | (2006.01) |

(52) U.S. Cl.
CPC ............ *H04L 47/193* (2013.01); *H04L 1/1835* (2013.01); *H04L 1/1854* (2013.01); *H04L 47/12* (2013.01); *H04L 47/18* (2013.01); *H04L 47/263* (2013.01); *H04L 47/29* (2013.01); *H04L 47/30* (2013.01); *H04L 47/34* (2013.01)

(58) Field of Classification Search
USPC .................................. 370/412, 419, 278, 282
See application file for complete search history.

(56) References Cited

U.S. PATENT DOCUMENTS

| | | | | |
|---|---|---|---|---|
| 5,822,524 | A  * | 10/1998 | Chen et al. .................... | 709/203 |
| 6,894,974 | B1 | 5/2005 | Aweva et al. | |
| 7,180,896 | B1 * | 2/2007 | Okumura ...................... | 370/394 |
| 2003/0067872 | A1 * | 4/2003 | Harrell et al. ................. | 370/229 |
| 2005/0021830 | A1 | 1/2005 | Urzaiz et al. | |
| 2007/0133405 | A1 | 6/2007 | Bowra et al. | |

OTHER PUBLICATIONS

Journal of Communications, vol. 28, No. 5, May 2007, pp. 22-29, Chen Zhi-Gang et al, "TCP-Friendly streaming medium transmitting mechanism in wireless networks", abstract.

* cited by examiner

*Primary Examiner* — John Pezzlo
(74) *Attorney, Agent, or Firm* — Canon USA, Inc. IP Division (57) ABSTRACT

The invention concerns a method of notifying control information to a congestion control mechanism in charge of controlling data segments sending rate of a server towards a client. The control information includes loss events where a loss event corresponds to one or more data segments lost. The method comprises a step of receiving data segments into a reception buffer at the client, a step of detecting loss events from the received data segments and a step of notifying the congestion control mechanism with a number of loss events that is dependent on the number of detected loss events and a measure of criticality related to the reception of the data segments by the client. The measure of criticality can be derived from the filling level of the reception buffer, the reception of data segments being in a critical state when the reception buffer is experiencing overflow or underflow conditions.

15 Claims, 6 Drawing Sheets

Standard TCP Reno (Prior art)

CLIENT BASED CONGESTION CONTROL MECHANISM

FIELD OF THE INVENTION

The invention relates to the field of the transmission of real-time multimedia digital data, in particular audio and/or video data, in a communication network such as an IP (Internet Protocol) network.

The present invention relates more particularly to a method of notifying control information to a congestion control mechanism in charge of controlling a data segments sending rate of a sender (server) towards a receiver (client).

Data segments are encapsulated for their transmission over the communication network in one or more data packets.

DESCRIPTION OF THE RELATED ART

A data communication network such as an IP network comprises many interconnection nodes (routers, switches etc.) which may contain data packet buffers. In this type of network, the phenomenon of congestion appears to be the main source of data losses when various data streams pass through the same link and that link has insufficient capacity.

The last incoming packets generally end up by being rejected by the interconnection node located at the entry to the link.

Moreover, congestions may create variable delays in the transmission of the packets of data from the server to the client. The congestions may be increased if too many packets are being sent within a short period of time.

In order to avoid these problems it is therefore necessary to use a congestion control mechanism.

Examples of well known congestion control algorithms are AIMD (acronym for "Additive Increase/Multiplicative Decrease", IETF RFC2581) which is part of the TCP/IP protocol specification and TFRC (acronym for "TCP Friendly Rate Control", IETF RFC3448). TFRC computes a target data packet sending rate that needs to be followed by the server when sending data packets. AIMD controls the average data packet sending rate of the server over a round trip time.

Thus, the sending of packets may be delayed and packets may be stored before being sent to the client depending on the targeted sending rate.

Furthermore, in order to recover data losses it is necessary to use an error correction method, such as the retransmission of the lost data packets. However, the implementation of this method introduces some delays in the reception of the retransmitted data packet or packets.

In a multimedia streaming application, usually the client starts to play the multimedia stream before receiving the multimedia data in its entirety. Thus, the receiving time of the packets of data is important. This is because a packet of data which is received after the time at which the data segment contained in this packet should have been played is no longer useful.

Latency is also an important factor particularly for real-time multimedia streaming applications such as video surveillance or video conference applications. The latency may be a few seconds in a video surveillance application or a few hundreds of milliseconds in a video conference application. For example, to maintain a good level of interactivity and thus a good quality for the users in a video conference application, the latency must typically be less than 120 milliseconds.

It is therefore important to correctly determine the sending rate of the packets in order to be received at the client at the right time and select the appropriate error correction method.

One of the difficulties in the evaluation of the sending rate as performed by the congestion control mechanisms known in the art (e.g. TFRC, AIMD) is that they rely on an aggregation of control information (losses detected, round trip time, etc.) to ensure both reliability and a fair sharing of network resources with other streaming applications. This leads to a coarse evaluation of the sending rate and makes these mechanisms well adapted for high latency streaming applications that provide a significant reception buffer at the client for masking the network jitter. For low latency real-time streaming applications, however, these congestion control mechanisms become much less efficient as the acceptable tolerance for the network jitter is smaller to meet more strict deadlines for the play out time of the data segments.

Furthermore, the prior art congestion control mechanisms favour reliability over timeliness and thus they do not provide satisfactory results for many real-time applications that can tolerate loss more than jitter (e.g. uncompressed video).

Therefore, there is a need to adapt the existing congestion control mechanisms for real-time and low latency streaming applications.

SUMMARY OF THE INVENTION

According to a first aspect of the present invention there is provided a method for notifying control information to a congestion control mechanism in charge of controlling data segments sending rate of a server towards a client. The control information includes loss events where a loss event corresponds to one or more data segments lost. The method comprising the steps of: receiving data segments into a reception buffer at the client; detecting loss events from the received data segments; and notifying the congestion control mechanism with a number of loss events that is dependent on the number of detected loss events and a measure of criticality related to the reception of the data segments by the client.

According to one embodiment of the invention, the measure of criticality is derived from the filling level of the reception buffer, the reception of data segments being in a critical state when the reception buffer is experiencing overflow or underflow conditions.

This method allows the client to have a fine tuning of its reception buffer filling level by appropriately interacting with the congestion control mechanism of the server. It avoids then overflow or underflow situations even for a small capacity reception buffer by relaxing the reliability and fairness properties of the server's congestion control mechanism only when necessary.

When the filling level of the reception buffer becomes low, acknowledging lost data segments (fake acknowledgments) causes the server not retransmitting those data segments which would have reached the client too late anyway (low filling level is indicative of short deadlines for the play out time) and also not reducing its sending rate (congestion window) which would have created a buffer underflow. This is obtained at the cost of being temporarily unfair relatively to other streaming applications in the network.

On the other hand, when the filling level of the buffer becomes high, lost data segments are normally not acknowledged. This causes the server to reduce its sending rate and thus avoiding buffer overflow. It also causes the retransmission of lost data segments which should reach the client in time (high filling level is indicative of longer deadlines for the play out time).

It is important to note that the above reception method is compatible with standard congestion control algorithms implemented at the server side like AIMD or TFRC. Only the client needs to be adapted to embody the invention. This has the advantage of leveraging existing protocol implementations by only adapting the client acknowledgment scheme.

According to an embodiment, the sending rate as controlled by the congestion control mechanism goes down as the number of notified loss events rises. In this embodiment, the ratio of notified loss events to detected loss events is increased as the filling level of the reception buffer rises.

According to one possible implementation, a first threshold is defined for representing underflow conditions. If the filling level of the reception buffer is below the first threshold, the number of notified loss events is set to be lower than the number of detected loss events.

Alternatively, or in addition, a second threshold, greater than the first threshold, can be defined for representing overflow conditions. If the filling level of the reception buffer is above said second threshold, the number of notified loss events is set to be higher than the number of detected loss events by considering a number of received data segments as lost.

According to one possible implementation, if the filling level of the reception buffer is above the first threshold and below the second threshold, the number of notified loss events is chosen to be equal to the number of detected loss events. No alteration in the number of notified loss events is thus performed.

According to another implementation, the congestion control module is implemented at the server device and wherein the notifying step comprises a step of sending acknowledgment packets to the server.

Advantageously, the notifying step is implemented at the client device. The server side is thus kept standard.

Alternatively, the notifying method comprises a further step of communicating the number of detected loss events and the measure of criticality to a control device. The notifying step can then be implemented at said control device which can be the server device embodying the congestion control mechanism.

According to a particular implementation, the communicating step consists of sending a message containing the number of detected loss events and the filling level of the reception buffer for deriving a measure of the criticality.

According to one possible implementation, one loss event is detected if there is at least one lost data segment in a round-trip time period.

According to a second aspect of the present invention there is provided a client device for receiving data segments from a server device, the sending rate of the server device is controlled by a congestion control mechanism relying on loss events. A loss event corresponds to one or more data segments lost. The client device comprising: a reception buffer for storing received data segments; means for detecting loss events from the received data segments; and means for notifying to the congestion control mechanism a number of loss events that is dependent on the number of detected loss events and a measure of criticality related to the reception of the data segments by the client.

Similarly to the corresponding method and according to an embodiment of the invention, the measure of criticality is derived from the filling level of the reception buffer, the reception of data segments being in a critical state when the reception buffer is experiencing overflow or underflow conditions.

A method or device for notifying control information to a congestion control mechanism embodying the present invention may be implemented using electronic data processing means. Methods embodying the invention include computer-implemented methods.

In particular, a method or device for notifying control information to a congestion control mechanism embodying the present invention may be implemented using a computer or processor that executes a program. Such a program may be provided by itself or may be carried by a carrier medium. The carrier medium may be a recording medium (or storage medium). The carrier medium may alternatively be a transmission medium. Thus, a program embodying the present invention may be transmitted in the form of a signal through a network. The carrier medium may be computer-readable.

In one particular embodiment, the invention pertains to a computer program product comprising program code instructions for implementing the above-mentioned method (in any of its different embodiments) when said program is executed on a computer.

In another particular embodiment, the invention pertains to a non-transitory computer-readable carrier medium, storing a program which, when executed by a computer or a processor in a device, causes the device to carry out the above-mentioned method (in any of its different embodiments).

The particular features and advantages of the client device, of the carrier medium and of the computer program product being similar to those of the method of notifying control information, they are not repeated here.

BRIEF DESCRIPTION OF THE DRAWINGS

The same numbers are used throughout the description and figures to reference like components and features.

DETAILED DESCRIPTION OF THE PREFERRED EMBODIMENTS

Figure 1:
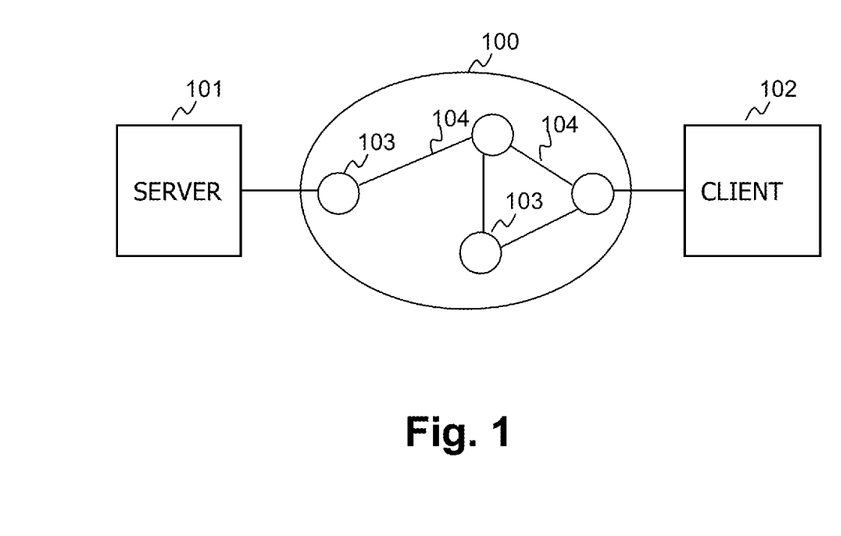
FIG. 1 depicts an example of a data communication network where the present invention can be implemented.

FIG. 1 is an example of a data communication network where the present invention can be implemented. A first communication apparatus or server 101 transmits data segments of a data stream to a second communication apparatus or client 102 across a data communication network 100. The data segments are packetized into data packets for their transport over the communication network. The data communication network may contain interconnection nodes 103, e.g. routers, and links 104 that create paths between devices. Interconnection nodes 103 and client 102 may drop data packets when congestion occurs (overflow of reception memories) which causes the loss of one or more data segments. A whole data segment is lost if the data packet in which it is contained is lost. Also, a whole data segment is considered to be lost if at least one data packet in which it is partly contained is lost.

The communication network 100 can be a wireless network (e.g. WiFi/802.11a/b/g/n or Wimax), a public mobile network (e.g. Long Term Evolution, 3G), an Ethernet-based Local Area Network (LAN) or a Wide Area Network (WAN) such as the Internet.

A congestion control mechanism is used for managing network traffic and for controlling congestions that may occur in the network. The congestion control mechanism is a feedback control algorithm that aims at controlling the data segment sending rate of the server 101 based on control information collected concerning the ongoing communication. The congestion control algorithm can be implemented at the server 101 exclusively or jointly by the server 101 and the client 102.

Different entities can notify control information to the congestion control mechanism including client 102. The client reports, among others, the amount of lost segments detected in the stream of received data segments. Losses are indicative of a congestion occurring somewhere in the network and the control algorithm reacts by reducing the transmission rate in order not to exacerbate the situation.

More details on the implementation of the congestion control algorithm according to different embodiments of the invention will be provided hereinafter.

Figure 2:
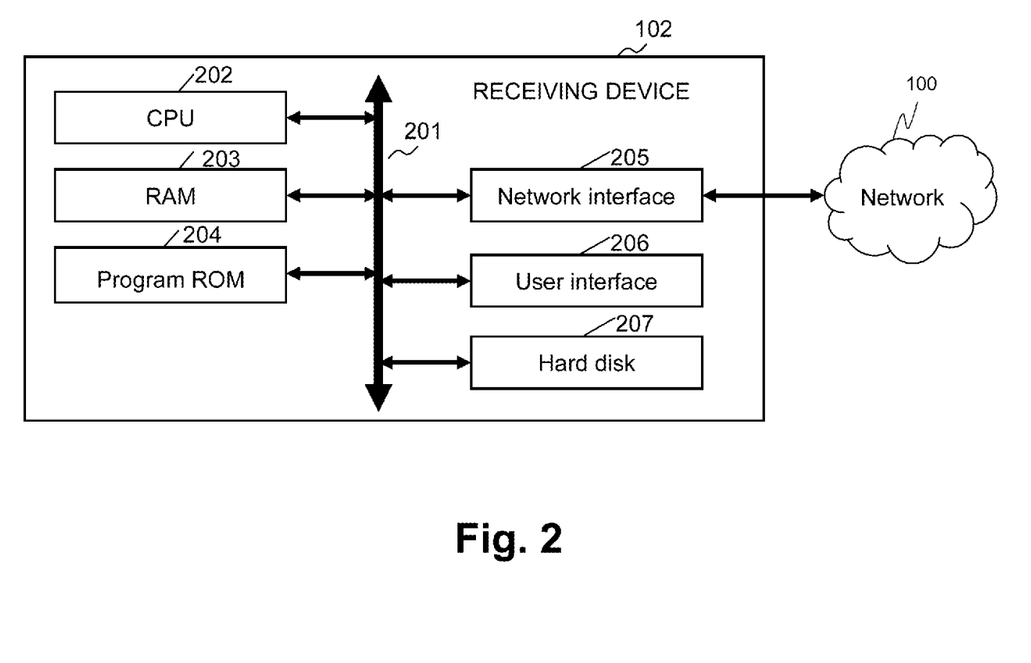
FIG. 2 illustrates a block diagram of a client device adapted to incorporate the invention.

FIG. 2 is a more detailed illustration of an exemplary architecture of the client 102 adapted to incorporate the invention.

The client 102 comprises a communication bus 201, a central processing unit (CPU) 202 capable of executing instructions from program ROM 204 on powering up of the device, and instructions relating to a computer program from main memory 203 after the powering up. The main memory 203 is for example of Random Access Memory (RAM) type which functions as a working area of CPU 202 via the communication bus 201, and the memory capacity thereof can be expanded by an optional RAM connected to an extension port (not illustrated). Instructions relating to the computer program may be loaded to the main memory 203 from the hard-disc drive (HDD) 207 or the program ROM 204 for example. Such computer program, when executed by the CPU 202, causes the steps of the flowcharts shown in FIGS. 3 and 6 to be performed.

As shown in FIG. 1, the client 102 communicates with the server 101 via the data communication network 100. This communication is done by means of a network interface 205 that allows the connection of the device to the communication network 100. The computer program when executed by the CPU is adapted to react to data packets transporting data segments received through the network interface and to provide data packet transporting feedback information (e.g. acknowledgments) via the communication network to the server device 101.

Reference numeral 206 represents an optional user interface that can be used to display information to, and/or receive inputs from, a user.

Figure 3:
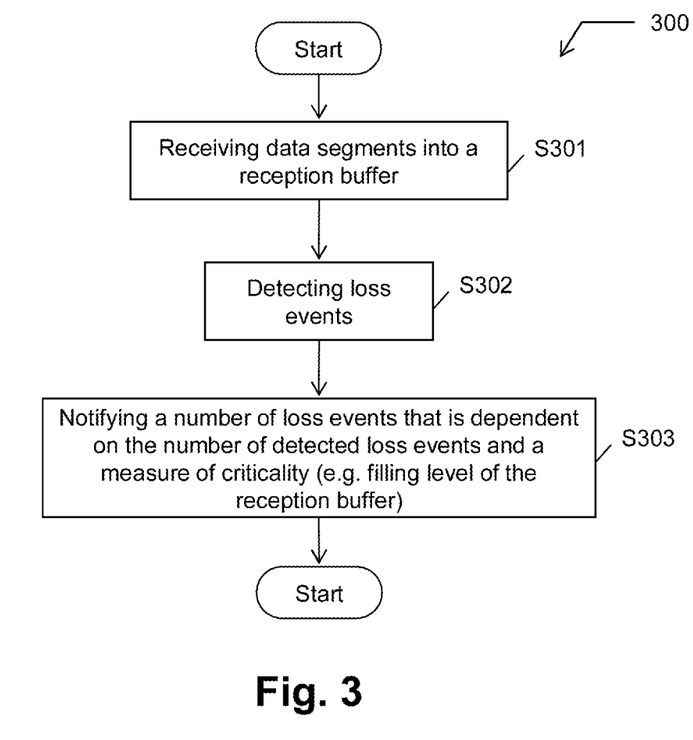
FIG. 3 summarizes the steps executed by client according to an embodiment of the invention.
Figure 6:
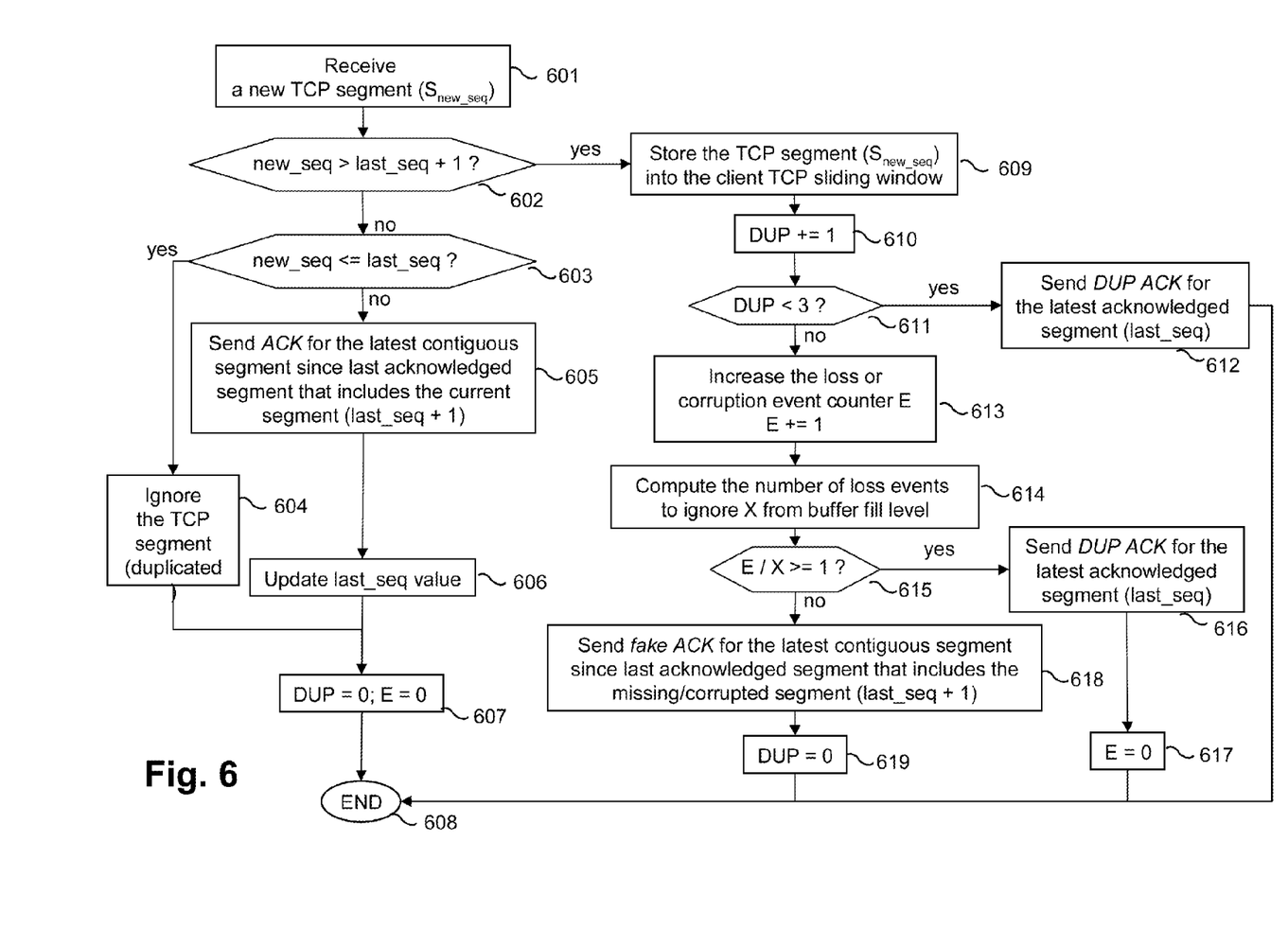
FIG. 6 is a flowchart illustrating a receiving method of data segments according to an embodiment of the invention.

It should be pointed out here that, as a variant, the device 102 for managing the reception of multimedia streams can have one or more dedicated integrated circuits (ASIC) that are capable of implementing the methods as described herein and in particular with reference to FIGS. 3 and 6. These integrated circuits are for example and non-restrictively, integrated into a reproduction apparatus for reproducing video sequences and/or audio sequences.

By way of a broad overview of the invention, standard control information notified by a client to known congestion control mechanisms is modified to let the client have more control on the sending rate of data segments by the server. This makes it possible to have a fine evaluation of what should be the sending rate at the server and to comply with given constraints such as for example constraints applicable to low latency streaming applications and/or favoring timeliness over reliability. Advantageously, by keeping the behavior of the congestion control mechanism standard, there is a minor impact on existing implementations of the communication protocol stack (e.g. TCP/IP). Furthermore, in a preferred embodiment of the invention, all modifications relating to control information notified to the congestion control mechanism are confined to the client side; this keeps the server standard and compatible with both clients embodying the invention and clients not embodying the invention.

FIG. 3 summarizes the steps executed by client 102 according to an embodiment of the invention. Namely, the procedure 300 shown in FIG. 3 provides an overview of a method of notifying control information to the congestion control mechanism.

In step S301, received data segments are stored in a reception buffer at the client 102. Reception buffer is a dedicated reception memory area in RAM 203 or in an internal memory (not shown) of the network interface 205 depending on implementations. As stated above, data segments are encapsulated into data packets for their transport over the communication network; the receiving step S301 comprises thus a step of retrieving payload information from the data packets received via network interface 205 and, if necessary, defragmenting the data segments.

In step S302, loss events are detected in the stream of received data segments.

In a preferred implementation, a loss event corresponds to one or more data segments lost during a predetermined period of time. The predetermined period of time is typically equal to a round-trip time, but can be chosen to be shorter or longer than a round-trip time to adapt the reactivity of the congestion control mechanism. Thus when a plurality of data segments is lost during that period, only one loss event is recorded. One reason for this is that all losses occurring during the predetermined period are considered as one indication of the same congestion; losses occurring in two periods of time are taken as two indications of congestion and so on.

In an alternate implementation, a loss event corresponds to one or more consecutive data segments losses. Similarly as above, a burst of losses can also be considered as an indication of congestion.

In a further alternate implementation in which the congestion control mechanism is reactive to individual losses for adapting server sending rate, a loss event can correspond to a single data segment loss.

A data segment loss is detected either by a break in the sequence numbering of the data segments or the expiry of a timer at the client. In TCP, each transmission reports the number of bytes transmitted so that the client is able to determine where it is in the reception. Techniques for detecting segment losses are well known in the art.

In step S303, a number of loss events are notified to the congestion control mechanism as one piece of control information on which the determination of the data segments sending rate is based. The number of notified loss events is made dependent on the number of loss events detected in step S302 on one hand, but also on a measure of criticality related to the reception of the data segments by the client.

According to a preferred embodiment of the invention, the measure of criticality is derived from the filling level of the reception buffer. Other parameters can be used for measuring the criticality of the reception as the client, solely or in combination with the filling level, as for example the rate of filling or of emptying of the reception buffer. A high filling/emptying rate of the buffer is an indication of a more critical state as overflow/underflow conditions are reached more quickly.

It should be noted that while the sending rate as controlled by the congestion control mechanism goes down as the number of notified loss events rises, the ratio of notified loss events to detected loss events goes up as the filling level of the reception buffer rises.

According to one implementation of the invention, a first threshold ($Th_1$) and a second threshold ($Th_2$), greater than the first threshold, of the filling level of the reception buffer are defined.

If the filling level of the reception buffer is below the first threshold $Th_1$, the number of notified loss events is set to be lower than the number of detected loss events. In an implementation where control information is fed back to the congestion control mechanism using acknowledgment packets, notifying fewer loss events than actually detected means that some fake acknowledgments are sent for acknowledging data segments not actually received by the client. The congestion control algorithm would then react by increasing, or at least not decreasing, data segments sending rate so that the reception buffer does not empty.

If the filling level of the reception buffer is above the second threshold $Th_2$, the number of notified loss events is set to be higher than the number of detected loss events. In an implementation where control information is fed back to the congestion control mechanism using acknowledgment packets, notifying more loss events than actually detected means that some acknowledgments are not sent and some data segments actually received by the client are not acknowledged. The congestion control algorithm would then react by decreasing, or at least not increasing, data segments sending rate so that the reception buffer does not overflow.

If the filling level of the reception buffer is above the first threshold $Th_1$ and below the second threshold $Th_2$, the number of notified loss events is chosen to be equal to the number of detected loss events. The congestion control mechanism behaves in the standard way.

As an example, the first and second thresholds are set to ⅓ and ⅔ respectively of the reception buffer size and the number of notified loss events is increased by one if the filling level is above ⅔ and decreased by one if the filling level is below ⅓. Further examples for these parameters are provided according to different embodiments of the invention described below.

According to an implementation variant of the invention, the values of the first ($Th_1$) and second ($Th_2$) thresholds are made dependent on the filling or emptying rate of the reception buffer. If the filling rate is high, the second threshold is preferably set to a lower value than nominal one to keep some margin in the buffer and time for the server to react and to reduce its sending rate to prevent overflow. If the emptying rate is high, the first threshold is preferably set to a higher value than nominal one to keep some margin in the buffer and time for the server to react and to maintain/increase its sending rate to prevent underflow. The pairs of first threshold-emptying rate and second threshold-filling rate are examples of criticality measures.

According to an implementation variant of the invention, the number of notified loss events is modified (lowered) only when the filling level of the reception buffer goes below the first threshold $Th_1$ and is kept unchanged otherwise. This implementation can be chosen when other techniques for preventing buffer overflow are available such as the use of an advertised window to control the amount of data the client is willing to receive, present in certain congestion control mechanisms.

The additive increase/multiplicative-decrease (AIMD) algorithm of TCP is a typical example of congestion control mechanism widely used in TCP/IP based networks. This algorithm calculates the maximum number of data segments to be sent without being acknowledged, termed a congestion window (CWND), and progressively increases it so long as the client 102 signals that the data segments are properly received. On average the AIMD algorithm causes the sending of one additional data segment each time an acknowledgment (ACK) is received, which causes a linear increase of CWND.

When the server finds that a data segment loss has occurred on the network, it interprets that as the network being congested. In reaction, the size of the window CWND is divided by 2, that is to say that half as many data segments will henceforth be sent without being acknowledged. This brings about a reduction by a factor of 2 in the data segment sending rate.

TCP-Friendly Rate Control (TFRC) is another example of a well known congestion control algorithm that has a much lower variation of throughput over time compared with TCP, making it more suitable for applications where a relatively smooth sending rate is of importance.

For its congestion control mechanism, TFRC directly uses a throughput equation for the allowed sending rate as a function of a loss event rate and round-trip time (RTT) as specified in IETF RFC 3448. The throughput equation is:

$$X = \frac{S}{R \times \sqrt{2 \times b \times L_{er}/3} + \left(t_{RTO} \times 3 \times \sqrt{3 \times b \times L_{er}/8} \times L_{er} \times (1 + 32 \times L_{er}^2)\right)}; \quad (1)$$

where:
X is the sending rate in bytes/second,
S is the packet size in bytes,
R is the round trip time (RTT) in seconds,
$L_{er}$ is the loss event rate, between 0 and 1.0, i.e. the number of loss events expressed as a fraction of the number of packets transmitted,
$t_{RTO}$ is a retransmission timeout, and
b is the number of packets acknowledged by a single TCP acknowledgement.

It should be noted that TFRC relies on loss events rather than packet losses directly to mimic the behaviour of TCP.

In a receiver-based implementation variant of TFRC the calculation of the loss event rate is done at the client 102. In a sender-based implementation variant of TFRC the calculation of the loss event rate is done at the server 101, based on information about packet losses fed back to the server 101 by the client 102.

Of course the invention is not limited to AIMD or TFRC congestion control mechanisms and any algorithm that causes the server to reduce its sending rate when transmitted data segments are dropped can be used.

As previously indicated, the implementation of the congestion control algorithm can be centralized at the server 101 or distributed over the server 101, the client 102 and possibly other devices undertaking part of the functions of the congestion control mechanism.

According to one implementation variant of the invention, the determination of the number of loss events to be notified to the congestion control mechanism is performed by the client 102. This has the advantage of keeping the server standard and compatible with both clients embodying the invention and clients not embodying the invention.

According to another implementation variant of the invention, the determination of the number of loss events to be notified to the congestion control mechanism is performed by the server 101. In this implementation the client device 102 communicates the number of loss events it detects to the server 101 in a standard way. In addition, the client 102 has to communicate the filling level of its reception buffer to be used with the number of detected loss events to generate a number of loss events to be notified.

Figure 4A:
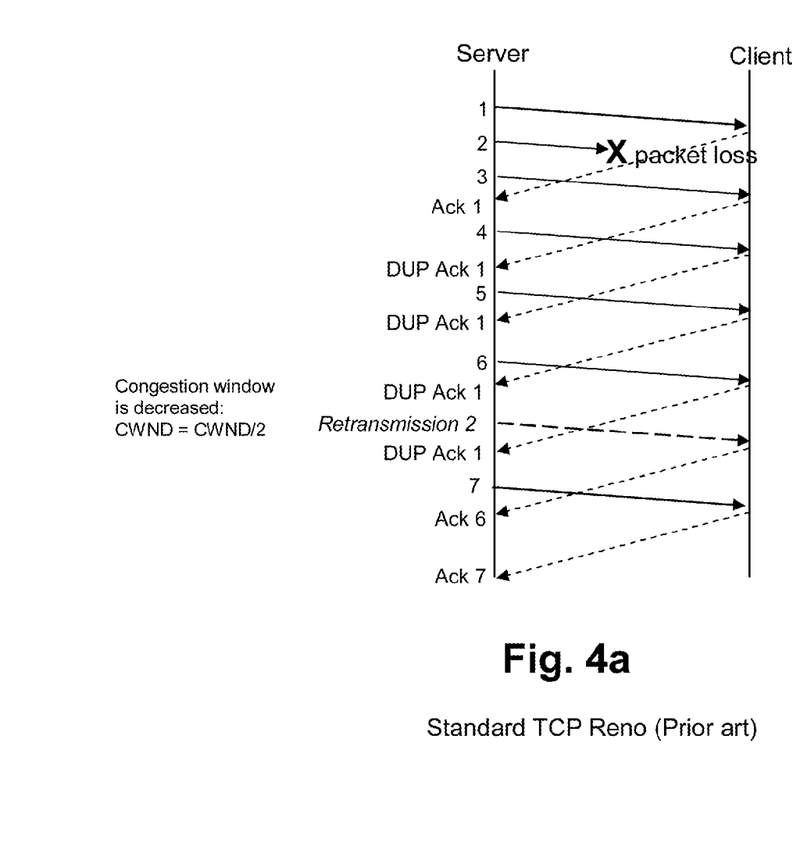
FIGS. 4a and 4b depict an example of data segments exchange between a server and a client when a data segment is lost, considering standard TCP and an embodiment of the invention.
Figure 4B:
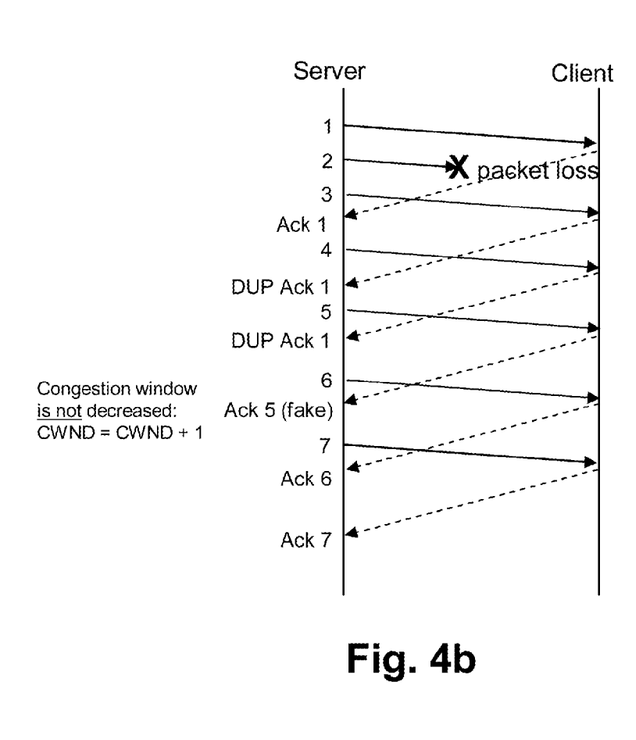

FIGS. 4a and 4b depict two examples of data segments exchanged between a server and a client when a data segment is lost. FIG. 4a illustrates the behaviour of a standard TCP protocol (e.g. TCP Reno) implementing the well-known fast retransmit algorithm. FIG. 4b illustrates the behaviour of TCP protocol according to one embodiment of the invention implemented at the client side, in the case where the filling level of the reception buffer of the client is below the first threshold $Th_1$.

Conventionally, TCP uses a sliding window protocol to organize its flow control when it sends data to a receiver. The sender can transmit up to a maximum number of data segments equal to the congestion window CWND before it stops and waits for an acknowledgement. Over time the sliding window moves forward (sequence numbers of authorized data segments to be sent are raised) as the receiver acknowledges contiguous and in order data segments. So when a packet containing a segment of data is lost, the server cannot move forward its sliding window until it is acknowledged by the client after one or several retransmissions.

In these two examples we assume that the congestion window is managed according to the AIMD algorithm as described above. According to this algorithm, TCP ensures the fairness among data streams on the network, that is to say a fair sharing of the available bandwidth among similar streams (having similar round trip times).

As represented in FIG. 4a, the server on the left side is sending TCP segments (here symbolically numbered from 1 to 7) to the client on the right side. TCP is required to generate an immediate acknowledgement (a duplicate ACK or "DUP ACK") when an out-of-order segment is received. The purpose of this duplicate ACK is to let the server know that a segment of data was received out of order. To avoid considering that a reordering of packets is a packet loss, TCP waits for a small number of duplicate ACKs to be received. If three or more duplicate ACKs are received in a row, TCP considers that a segment of data has been lost. The server reduces the congestion window (CWND) by about one half and then performs a retransmission of what appears to be the missing segment, without waiting for a retransmission timer to expire. This is the usual behaviour of TCP known as the fast retransmit algorithm.

With this behaviour, TCP ensures the reliability of data streams sent on the network. But this behaviour doesn't allow guaranteeing deadlines for time-sensitive data streams. For such data, rather than guaranteeing a complete reliability in any occasions, it would be better to discard data that cannot be delivered on time and to continue to stream timely data.

According to an embodiment of the invention illustrated in FIG. 4b, the client's TCP/IP protocol is modified to generate an acknowledgement (fake-ACK) instead of the third duplicate ACK (assuming that the reception buffer fill level is below the first threshold $Th_1$ as stated above). The client still waits for a small number of duplicate ACKs (typically two duplicate ACKs) before sending a fake ACK in order to cope with small reordering of packets. When the server receives the fake ACK, it acts as if the lost segment has been received by the client; it moves forward its sliding window and increases its congestion window as usual.

By sending fake acknowledgements to the server, the resulting TCP protocol between the client and the server does not only relax its reliability property, but it also loses temporarily its fairness relatively to other data streams on the network. If the client would send a fake ACK for each packet loss, the server would indefinitely increase its congestion window and grab the whole available bandwidth.

However one aim of the invention is also to maintain some degree of fairness with other streams. The degree of fairness will vary depending on a degree of "criticality" or urgency as perceived by the client. The higher the criticality is, the less fair the protocol will be. The client is considered to be in a critical state when the filling level of the reception buffer goes below the first threshold $Th_1$. The closer the buffer is to underflow conditions, the higher the criticality is.

It should be noted that the client is not considered to be in a critical state when the filling level of the reception buffer is above the second threshold $Th_2$; this is because not fairness issue is raised relatively to other data streams. Indeed, in the embodiment of the invention where the client does not acknowledge actually received data segments to reduce the server sending rate (filling level above threshold $Th_2$), bandwidth is released for the benefit of other data streams.

According to a preferred embodiment of the invention, the number of loss events notified to the congestion control mechanism when the client is in a critical state (filling level below first threshold $Th_1$) is calculated by means of degrees of acceptable fairness.

Figure 5:
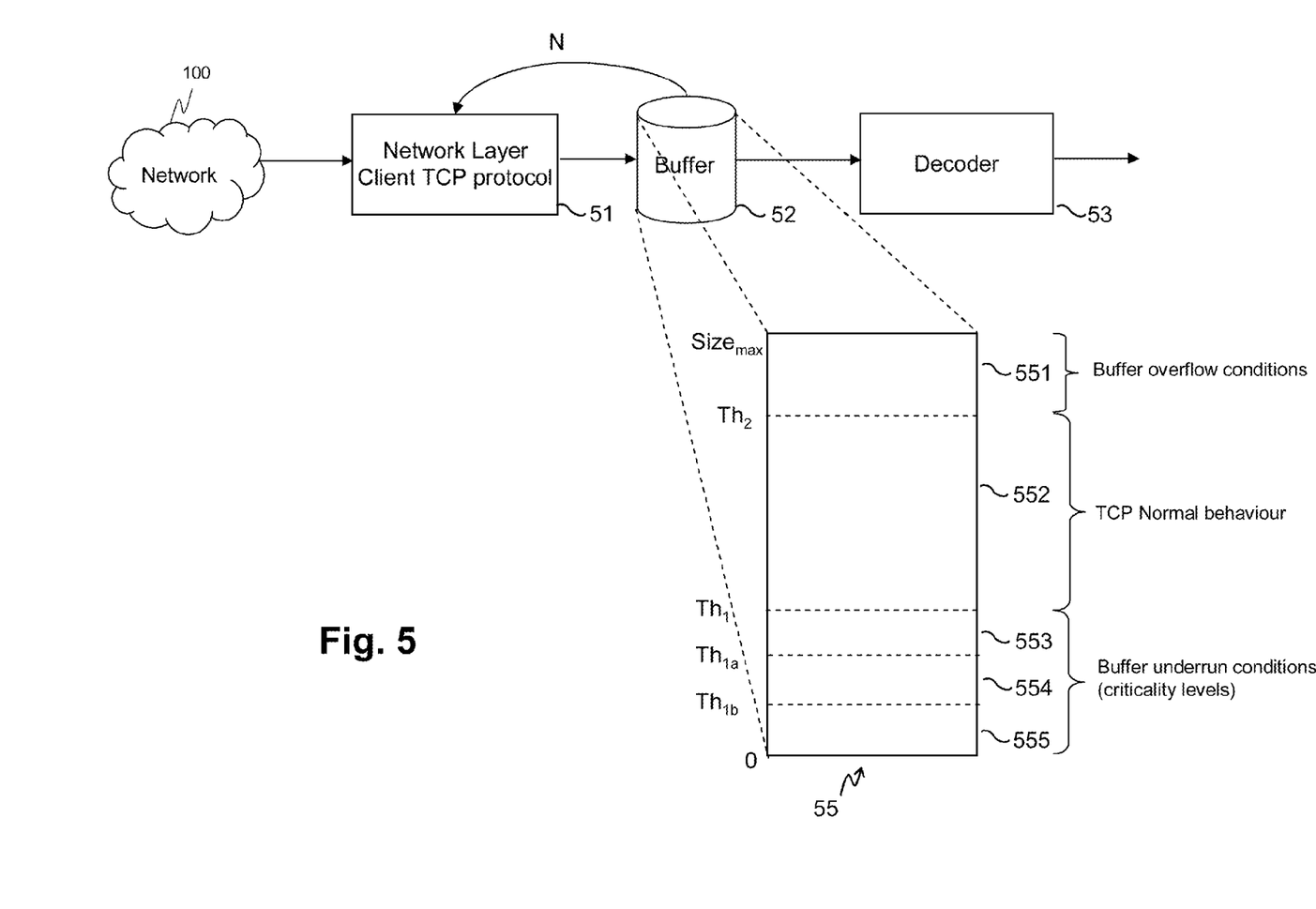
FIG. 5 illustrates a partitioning of the reception buffer according to an embodiment of the invention.

FIG. 5 shows an implementation example of the above preferred embodiment in the case of an AIMD type congestion control mechanism. It should be noted that an implementation can be similarly undertaken with a TFRC type congestion control mechanism.

At the client side, the stream is received from the network 100 by the client's TCP protocol module 51. Received data segments are stored into the reception buffer 52 before being decoded by the decoder 53. Alternatively, or in addition, the stored data segments are delivered for rendering such as for example displaying a video stream formed by the received data segments.

The content 55 of buffer 52 is partitioned for example into five areas 551, 552, 553, 554 and 555.

Area 551 corresponds to a filling level above the second threshold $Th_2$. As discussed above, in this area 551 the buffer is close to overflow conditions, which means that the server is sending too much data to the client. In an embodiment of the invention, the client can reduce its advertised window to slow down the bit rate from the server.

Area 552 corresponds to normal behavior of the multimedia streaming for which the filling level of the reception buffer is between the thresholds $Th_1$ and $Th_2$. The server sends enough data for the multimedia stream to be on time for the application. The size of this area allows absorbing network jitters. Here there is no need to be less fair with other network streams.

The areas 553, 554 and 555 correspond to situations where the buffer is coming closer to underflow conditions. Several "sub-thresholds" $Th_{1a}$ and $Th_{1b}$ are defined corresponding to different criticality levels. The closer to zero the buffer level is, the higher the criticality is. These areas 553, 554 and 555 will be associated with different degrees of fairness. A given degree of acceptable fairness is defined for each criticality level and that degree will serve as basis for determining a number of loss events to be notified.

The degree of fairness can be evaluated by means of a factor N that represents the ratio of the bandwidth that would be consumed when implementing an unfair congestion control mechanism, i.e. after adapting the number of notified loss events, to that of a standard congestion control mechanism. The bandwidth consumed when implementing an unfair congestion control mechanism for a TCP flow can be seen as equivalent to that of N virtual TCP flows.

The relationship between the factor N and the number of loss events to be notified can be derived from the concepts underlying MulTCP or MulTFRC protocols for example.

In case of MulTCP, the Additive Increase Multiplicative Decrease (AIMD) algorithm is modified to emulate the behavior of N TCP flows. This modification is performed by changing how the congestion window is managed:

the congestion window is increased by N data segments, i.e. $CWND_{updated}=CWND+N$ (instead of $CWND_{updated}=CWND+1$), when one data segment is acknowledged; and the congestion window is decreased by CWND/2N, i.e. $CWND_{updated}=CWND-CWND/2N=CWND\times(1-0.5/N)$ (instead of $CWND_{updated}=CWND-CWND/2=CWND/2$) when one loss event is detected.

Considering the above, MulTCP would have to face N loss events in order to reach the same bandwidth level than the standard TCP would have reached after only one loss event.

As the server is not modified and it will behave as a conventional TCP server with regards to the way it manages the congestion window, the concept of MulTCP (or MulTFRC) will serve for determining the number of loss events to be notified to obtain an overall TCP behavior that mimics the MulTCP behavior.

Let's consider that the number of loss events to be notified to the congestion control mechanism is 1 over X, i.e. X−1 loss events are masked. The variable X must fulfill the following equation:

$$CWND/2=CWND(1-0.5/N)^X.$$

That is to say:

$$X=\ln(0.5)/\ln(1-0.5/N).$$

Thus by notifying only 1 over X loss events, the congestion control mechanism will act as if it was controlling N TCP streams, which corresponds to a degree of fairness equal to N.

In a preferred implementation of the invention, N is kept less or equal to 4. The values of N are not necessarily discrete values. N can continuously vary from 1 to 4. The value 1 is assigned to area 552 to represent a fair behavior since the number of notified loss events is not altered. Areas 553, 554 and 555 are assigned for example the values 2, 3 and 4 respectively. It is possible then to deduce the number of notified loss events based on the variable X, which in this case equals respectively and approximately the values of 2.5, 4 and 5. One loss event will then be notified over 2.5, 4 or 5 detected loss events depending on the reception buffer filling level.

FIG. 6 is a flowchart illustrating a method of receiving data segments according to one embodiment of the invention. It shows when the client has to send a fake acknowledgment to the server. It is assumed in this embodiment that the congestion control mechanism is implemented in the server.

At step 601, the client receives a new TCP data segment $S_{new\_seq}$ with the sequence number new_seq.

At step 602, the client determines if the sequence number (new_seq) of the received data segment $S_{new\_seq}$ is contiguous and in-order compared to the latest sequence number received in-order. In particular it checks if there is a gap in sequence numbers.

If the new sequence number new_seq is not greater than the latest sequence number plus one, the client then determines at step 603 if the received data segment is a duplicated data segment or not. If the received sequence number is less than or equal to the latest in-order sequence number last_seq, it means that this data segment has already been received. This duplicated data segment is discarded at step 604.

Otherwise, being at step 605 means that the sequence number new_seq is equal to last_seq plus one. The client sends then an acknowledgement (ACK) to the server with the sequence number of the latest contiguous segment since the last acknowledgement segment that includes the current segment. The in-order and continuous block of data can be delivered to the application.

At step 606, the last_seq value is updated to the sequence number acknowledged at step 605. Internal algorithm states (number of detected loss events and of duplicate ACKs) are reset at step 607.

If at step 602, there is a gap in sequence numbers between the new received TCP segment and the latest in-order sequence number, then the received TCP segment is stored into the client TCP sliding window buffer at step 609.

At step 610, a counter of out-of-order packets is incremented in the internal state variable DUP.

At step 611, if the number of out-of-order packets is less than three (DUP<3), the client sends a duplicate acknowledgement (DUP ACK) that reports again to the server the latest acknowledged segment (last_seq).

If at step 611, the number of out-of-order packets is equal to three, the client knows that the server will detect a packet loss if it receives a new duplicate ACK. So at step 613, the number E of detected loss events is increased. However, before sending an acknowledgment to the server, a check is performed considering the filling level of the reception buffer (evaluation of the criticality) to determine whether a DUP ACK (thus a notification of a loss event) or a fake ACK (thus a masking of the loss event) is to be sent to the server.

It is computed at step 614 the value X that allows the determination of the number of loss events that should be notified as explained above. The determination is based on the filling level of the reception buffer.

At step 615, the client determines if it must send a duplicate acknowledgement or a fake acknowledgement by comparing the values of E and X. If the ratio E/X is superior or equal to one, the client sends a DUP ACK at step 616 with the latest acknowledged segment (last_seq), and the counter of loss events is reset at step 617. Otherwise, the client sends a fake acknowledgement for the latest contiguous segment since last acknowledged segment that includes the missing/corrupted segment (last_seq+1). And the counter of out-of-order packets DUP is reset at step 619.

Comparing the ratio between E and X is just an implementation example. In an alternate implementation one loss event notification is generated out of X detected loss events can be achieved on average only.

This application claims the benefit of Great Britain Patent Application No. 1019344.9 filed Nov. 16, 2010 which is hereby incorporated by reference herein in its entirety.

The invention claimed is:

1. A method of notifying control information to a congestion control mechanism in charge of controlling data segments sending rate of a server towards a client, the method comprising:

receiving data segments into a reception buffer at the client;

detecting loss events from the received data segments, a loss event corresponding to one or more lost data segments; and notifying the congestion control mechanism with a number of notified loss events that is different from a number of detected loss events and is dependent on the number of detected loss events and a measure of criticality related to the reception of the data segments by the clients.

2. A method according to claim 1, wherein the measure of criticality is derived from a filling level of the reception buffer, the reception of data segments being in a critical state when the reception buffer is experiencing overflow or underflow conditions.

3. A method according to claim 2, wherein the sending rate as controlled by the congestion control mechanism decreases as the number of notified loss events rises and wherein the ratio of the number of notified loss events to the number of detected loss events is increased as the filling level of the reception buffer rises.

4. A method according to claim 3, wherein a first threshold is defined for representing underflow conditions and wherein, if the filling level of the reception buffer is below said first threshold, the number of notified loss events is set to be lower than the number of detected loss events.

5. A method according to claim 4, wherein a second threshold, greater than the first threshold, is defined for representing overflow conditions and wherein, if the filling level of the reception buffer is above said second threshold, the number of notified loss events is set to be higher than the number of detected loss events by considering a number of received data segments as lost.

6. A method according to claim 5, wherein, if the filling level of the reception buffer is above said first threshold and below said second threshold, the number of notified loss events is chosen to be equal to the number of detected loss events.

7. A method according to claim 1, wherein the congestion control mechanism is implemented at the server device and wherein the notifying step comprises a step of sending acknowledgment packets to the server.

8. A method according to claim 1, wherein the notifying step is implemented at the client device.

9. A method according to claim 1, further comprises a step of communicating the number of detected loss events and the measure of criticality to a control device and wherein the notifying step is implemented at the control device.

10. A method according to claim 1, wherein one loss event is detected if there is at least one lost data segment in a round-trip time period.

11. A client device for receiving data segments from a server device, the sending rate of the server device being controlled by a congestion control mechanism, the client device comprising:
a reception buffer for storing received data segments;
a detecting unit for detecting loss events from the received data segments, a loss event corresponding to one or more lost data segments; and
a notifying unit for notifying to the congestion control mechanism a number of notified loss events that is different from a number of detected loss events and is dependent on the number of detected loss events and a measure of criticality related to the reception of the data segments by the clients.

12. A client device according to claim 11, wherein the measure of criticality is derived from a filling level of the reception buffer, the reception of data segments being in a critical state when the reception buffer is experiencing overflow or underflow conditions.

13. A non-transitory computer readable medium storing a program which, when executed by a computer or processor, causes the computer or processor to perform operations of notifying control information to a congestion control mechanism in charge of controlling data segments sending rate of a server towards a client, the operations comprising:
receiving data segments into a reception buffer at the client;
detecting loss events from the received data segments, a loss event corresponding to one or more lost data segments; and
notifying the congestion control mechanism with a number of notified loss events that is different from a number of detected loss events and is dependent on the number of detected loss events and a measure of criticality related to the reception of the data segments by the client.

14. The computer readable medium according to claim 13, wherein the measure of criticality is derived from a filling level of the reception buffer, the reception of data segments being in a critical state when the reception buffer is experiencing overflow or underflow conditions.

15. A method of notifying control information to a congestion control mechanism in charge of controlling data segments sending rate of a server towards a client, the method comprising:
receiving data segments into a reception buffer at the client;
detecting loss events from the received data segments, a loss event corresponding to one or more lost data segments; and
notifying the congestion control mechanism with a number of notified loss events that is different from a number of detected loss events when a filling level of the reception buffer is experiencing overflow or underflow conditions.

* * * * *